US011215270B1

(12) United States Patent
Anstice et al.

(10) Patent No.: US 11,215,270 B1
(45) Date of Patent: Jan. 4, 2022

(54) ONE-TO-ONE RATIO HIGH-TORQUE DIGITAL REGISTER FOR INDUSTRIAL MACHINERY

(71) Applicants: Timothy Anstice, Grapevine, TX (US); Scott Wilcox, Crowley, TX (US); Stanley Mount, Fort Worth, TX (US)

(72) Inventors: Timothy Anstice, Grapevine, TX (US); Scott Wilcox, Crowley, TX (US); Stanley Mount, Fort Worth, TX (US)

(73) Assignee: Thacker Industrial Service Co., Fort Worth, TX (US)

( * ) Notice: Subject to any disclaimer, the term of this patent is extended or adjusted under 35 U.S.C. 154(b) by 676 days.

(21) Appl. No.: 16/014,847

(22) Filed: Jun. 21, 2018

(51) Int. Cl.
*F16H 49/00* (2006.01)
*F16H 55/08* (2006.01)
*B26D 5/02* (2006.01)
*B26D 7/01* (2006.01)
*B26D 7/00* (2006.01)

(52) U.S. Cl.
CPC ........... *F16H 55/0833* (2013.01); *B26D 5/02* (2013.01); *B26D 7/015* (2013.01); *F16H 49/001* (2013.01); *B26D 2007/005* (2013.01)

(58) Field of Classification Search
CPC ..................................... F16H 49/001
USPC ............................................. 74/640
See application file for complete search history.

(56) References Cited

U.S. PATENT DOCUMENTS

| | | | | |
|---|---|---|---|---|
| 3,495,108 A | * | 2/1970 | Van Buskirk | G08C 19/48 310/68 R |
| 5,233,247 A | * | 8/1993 | Stark | F16H 49/001 310/49.47 |
| 5,307,885 A | * | 5/1994 | Kuwana | E21B 7/062 175/106 |

* cited by examiner

*Primary Examiner* — Ha Dinh Ho
(74) *Attorney, Agent, or Firm* — James E. Walton

(57) ABSTRACT

A system and method for registration of rotary drive shaft in a high-torque environment. The system utilizes a pair of connected harmonic drives to allow the clocking or registration of the rotary drive shaft without backlash and without requiring gearing changes as a result of a single harmonic drive. The pair of connected harmonic drives is coupled together by a tandem coupling.

16 Claims, 6 Drawing Sheets

ONE-TO-ONE RATIO HIGH-TORQUE DIGITAL REGISTER FOR INDUSTRIAL MACHINERY

BACKGROUND

1. Field of the Invention

The present invention relates generally to industrial corrugated box machines and more specifically to a precise system for adjusting registration on print and die cut sections of the machine.

2. Description of Related Art

Industrial machines for corrugated box production require precise and adjustable registration between the upper and lower rolls of both the print and die cut sections of the machine. The upper and lower rolls are geared together and rotate at the same speed. Registration is accomplished by rotating one roll slightly in relation to the other, sometimes called phase adjustment. Older conventional systems utilized a slip ring motor and gearing to accomplish this. However, backlash in the gearing and inaccurate motor control made registration accuracy unacceptable for modern box-making standards.

More recent upgrades have utilized single harmonic drives and digital motors but this required gear train modification to compensate for the harmonic drive ratio and torque capacity was reduced. Thus there exists significant room for improvement in the art of overcoming these and other shortcomings of conventional systems and methods for accurate registration adjustment of a pair of rotating rolls in multi-color printing or die-cutting sections of corrugated box machines.

DESCRIPTION OF THE DRAWINGS

The novel features believed a characteristic of the embodiments of the present application is set forth in the appended claims. However, the embodiments themselves, as well as a preferred mode of use, and further objectives and advantages thereof will best be understood by reference to the following detailed description when read in conjunction with the accompanying drawings, wherein:

Figure 1:
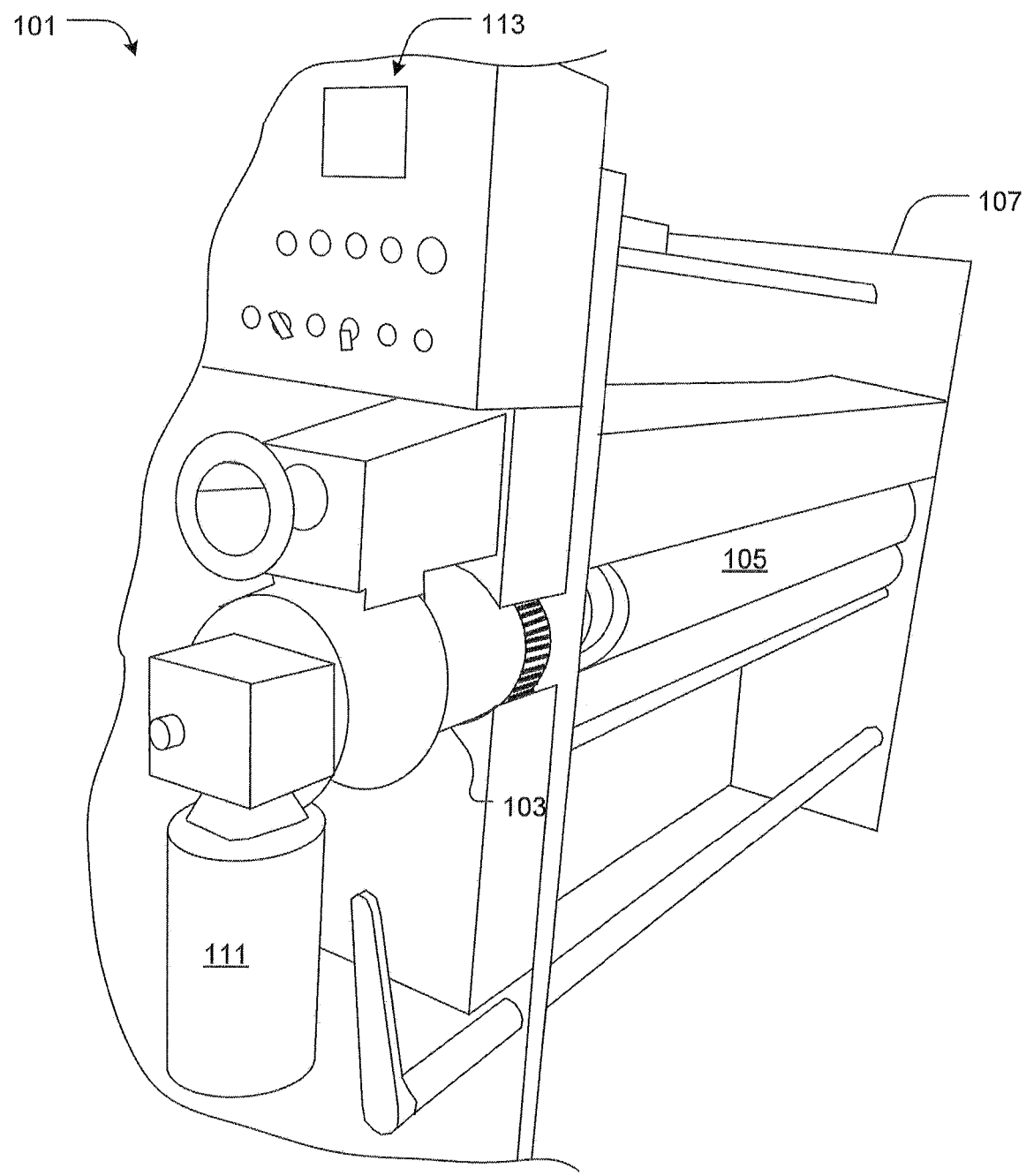
FIG. 1 is a partial perspective view of an improved digital register on a corrugated box machine section according to the present application.

While the assembly and method of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of a digital register for industrial machinery are provided below. It will, of course, be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, a preferred embodiment of a one-to-one digital register on an industrial machine according to the present application is illustrated. System 101 is comprised of a one-to-one digital register 103 located on a rotary shaft 105 of a cardboard cutter 107. Digital register 103 is utilized to accurately position rotary shaft 105 by registration. Motor 111 utilizes an encoder (not shown) to selectively rotate the register 103 thereby selectively rotating the rotary shaft 105. Registration is displayed on display 113 with two decimal places of accuracy.

Figure 2:
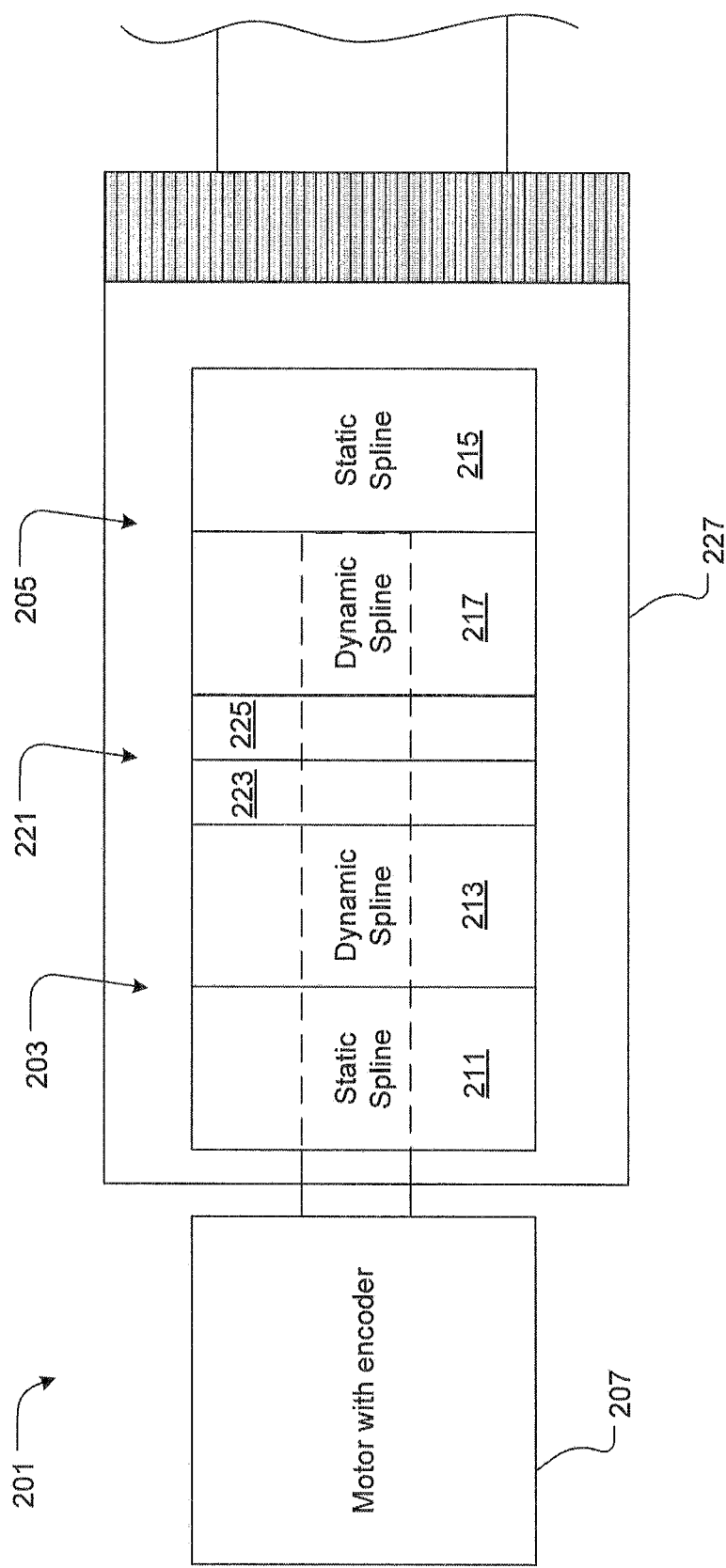
FIG. 2 is a plan view of a one-to-one ratio torque digital register according to the present application.

Referring now also to FIG. 2 in the drawings, a preferred embodiment of a one-to-one digital register according to the present application is illustrated. Digital register 201 is comprised of a first harmonic drive 203 coupled to a second harmonic drive 205 coupled to a motor 207 having an encoder (not shown). The first harmonic drive 203 is comprised of a static spline 211 engaged with a dynamic spline 213. The second harmonic drive 205 is comprised of a static spline 215 engaged with a dynamic spline 217. The dynamic spline 213 of the first harmonic drive 203 is coupled to the dynamic spline 217 of the second harmonic drive 205 by a split coupling 221. Split coupling 221 is comprised of a first ring 223 and a second ring 225. Additionally, the second harmonic drive 205 is coupled to a housing 227 having a geared portion, the housing is configured to drive a rotary drive shaft, such as rotary drive shaft 105.

Rotation of the first harmonic drive 203 by the motor 207 thereby causes rotation of the second harmonic drive 205. Considering the first harmonic drive has a ratio of −1 and the second harmonic drive 205 has a ratio of +1 the ratio of input rotation to output rotation across digital register 201 is one-to-one because the +1 is negated by the −1.

Figure 3B:
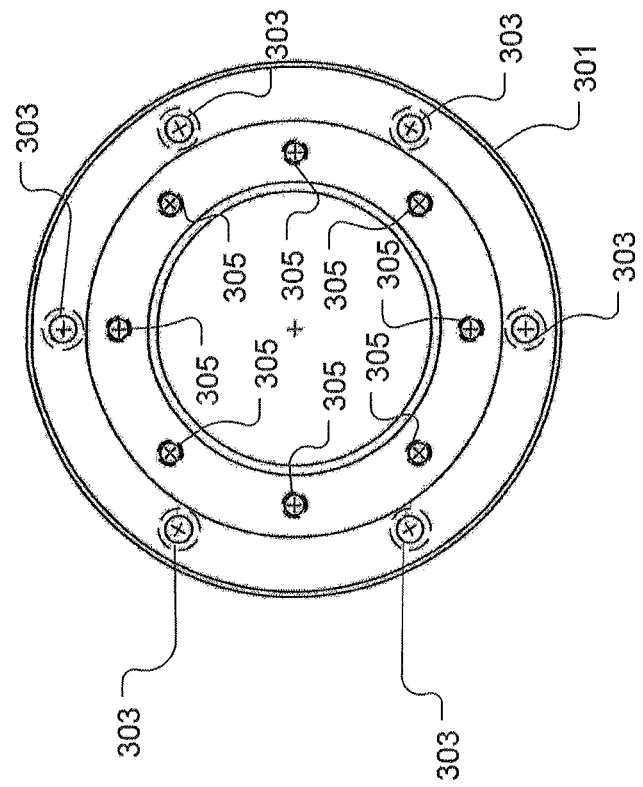
FIG. 3B is a front view of a left side of a tandem coupling according to the present application.
Figure 3A:
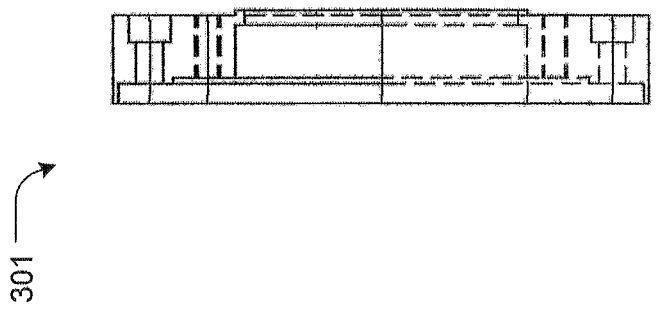
FIG. 3A is a side view of a left side of a tandem coupling according to the present application.

Referring now also to FIGS. 3A-3B in the drawings, a preferred embodiment of a left side of a tandem coupling according to the present application is illustrated. Left side member 301 is an annular shaped ring having openings 303 configured for flush fasteners to couple the left side member 301 to a harmonic drive. Left side member 301 further comprises threaded openings 305 configured for fasteners to couple the left side member 301 to a right side member.

Figures 4A, 4B:
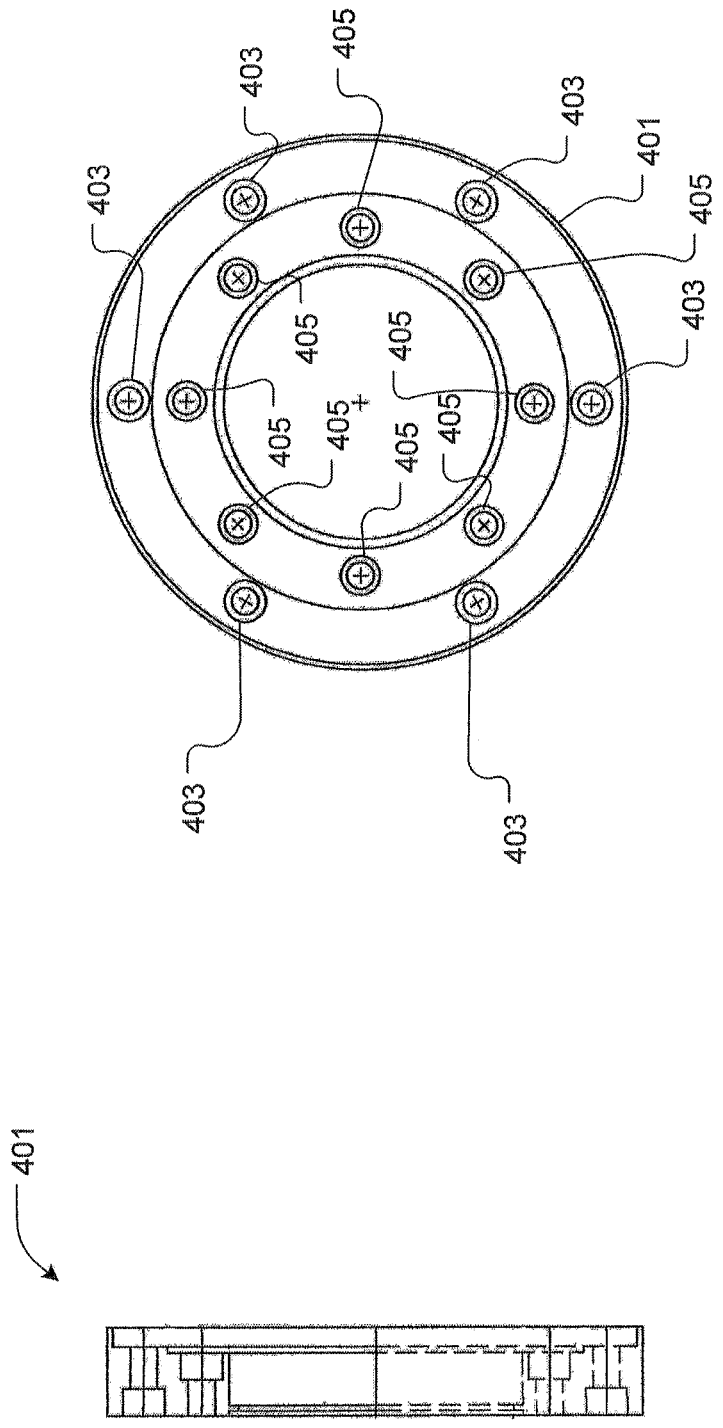
FIG. 4A is a side view of a right side of a tandem coupling according to the present application.
FIG. 4B is a front view of a right side of a tandem coupling according to the present application.

Referring now also to FIGS. 4A-4B in the drawings, a preferred embodiment of a right side of a tandem coupling according to the present application is illustrated. Right side member 401 is an annular shaped ring having openings 403 configured for flush fasteners to couple the right side member 401 to a harmonic drive. Right side member 401 further comprises openings 405 configured for flush fasteners to couple the right side member 401 to a left side member. The openings of right side coupling are configured so that they face opposite directions as shown in FIG. 4A.

Figure 5:
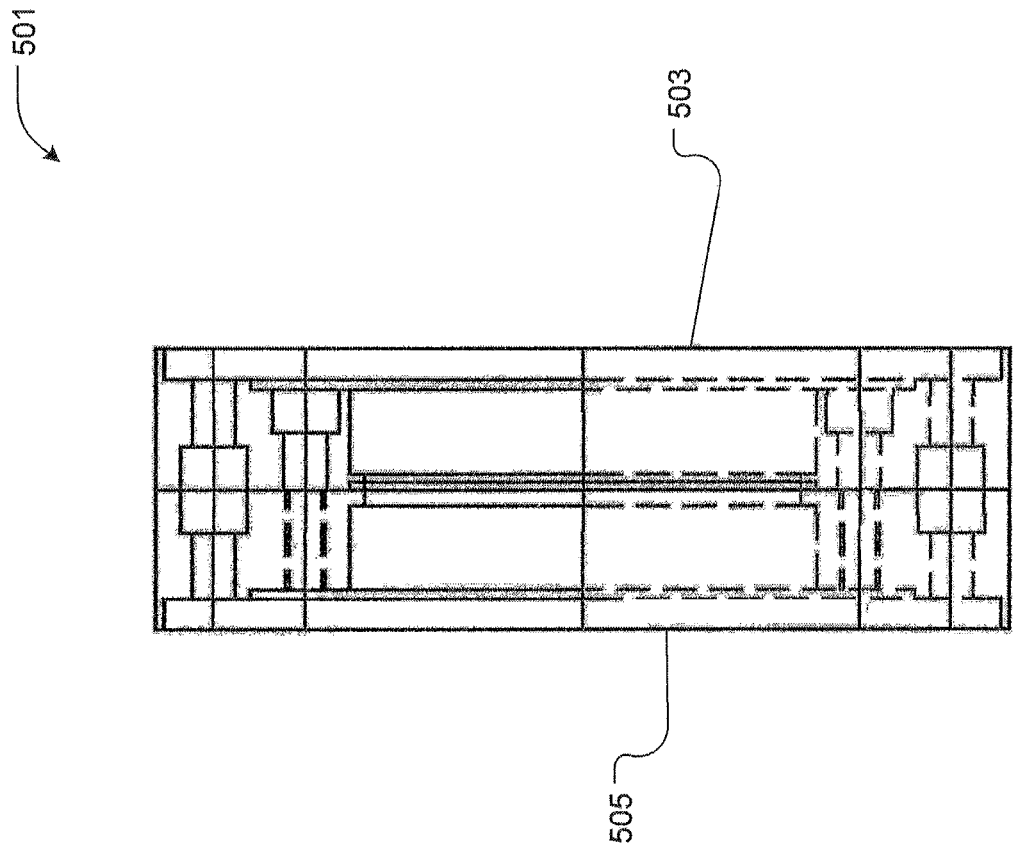
FIG. 5 is a side view of an assembled tandem coupling according to the present application.

Referring now also to FIG. 5 in the drawings, a preferred embodiment of a tandem coupling according to the present application is illustrated. Tandem coupling 501 is comprised of right side member 503 coupled to a left side member 505.

Figure 6:
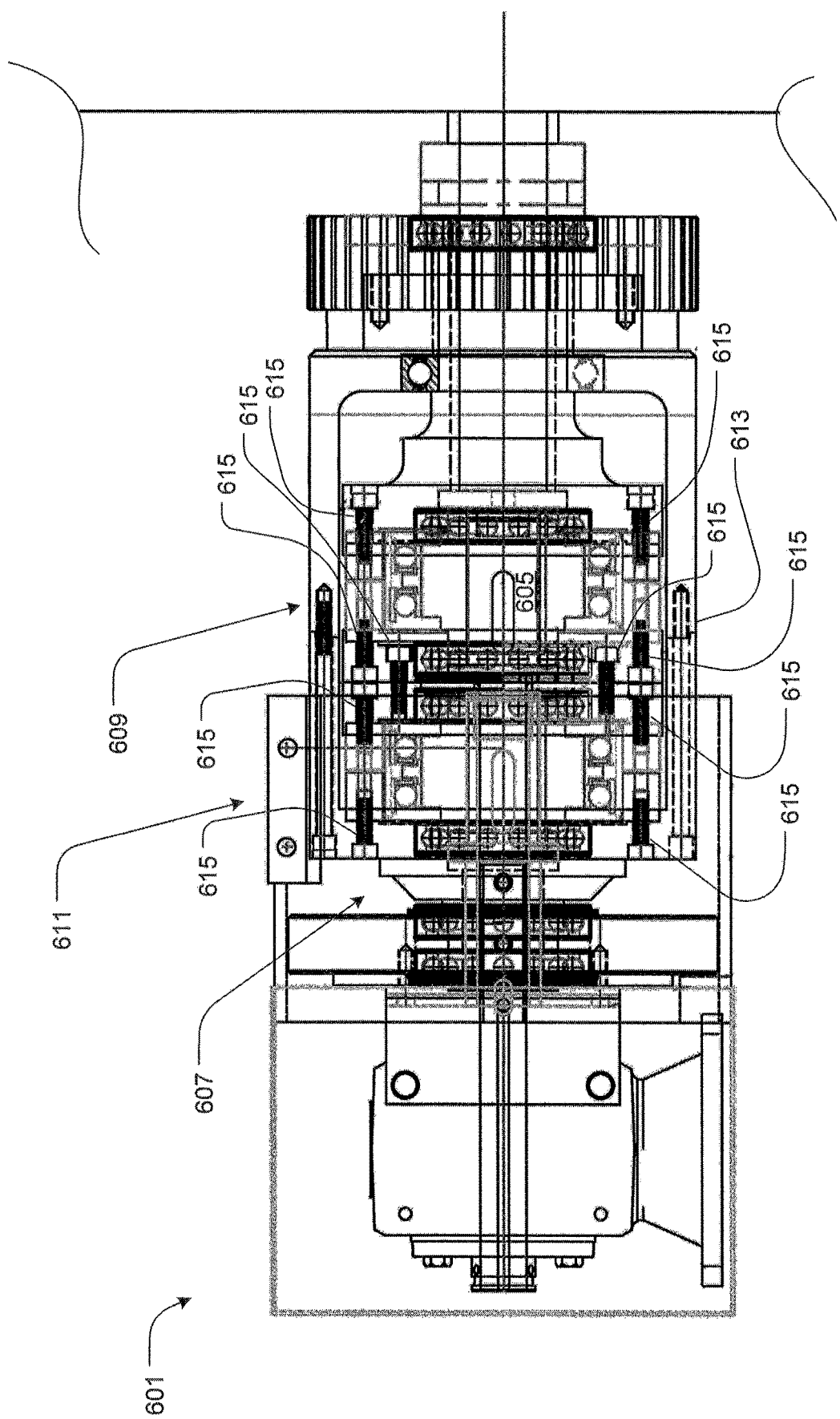
FIG. 6 is a side view of a one-to-one ratio torque digital register according to the present application.

Referring now also to FIG. 6 in the drawings, a preferred embodiment of a one-to-one digital register on an industrial machine according to the present application is illustrated. System 601 is comprised of a motor 603 that drives a shaft 605 through a hollow hub 607. Shaft 605 drives a dynamic spline of a first harmonic drive 609. The first harmonic drive 609 drives a second harmonic drive 611. A static spline of the second harmonic drive 611 drives housing 613 which is configured to drive a rotary shaft, such as such as rotary drive shaft 105. Fasteners 615 couple the various elements together.

While the preferred system for these one-to-one digital registers is in the corrugated box machine industry, other industrial equipment that requires high torque along with high angular accuracy is contemplated by this application. This system provides at least the following improvements over conventional systems such as no requirement to modify gear ratios on existing gear trains as the one-to-one ratio precludes ratio changes; this system is configured to handle torques in excess of five thousand eight hundred inch pounds up to twenty-six thousand six hundred inch pounds; maintenance is reduced as slip rings with brushes and commutators are eliminated.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments but are amenable to various changes and modifications without departing from the spirit thereof.

What is claimed is:

1. A harmonic drive register for selectively changing the phase of a rotary shaft, the harmonic drive register comprising:
    a first harmonic drive;
    a second harmonic drive;
    a tandem coupling that rotationally attaches the first harmonic drive to the second harmonic drive; and
    a motor having a motor shaft, the motor shaft being coupled to the first harmonic drive;
    wherein the ratio of the first harmonic drive to the second harmonic drive is one-to-one; and
    wherein selective rotation of the motor shaft selectively changes the phase of the rotary shaft.

2. The harmonic drive register according to claim 1, the first harmonic drive comprising:
    a static spline; and
    a dynamic spline.

3. The harmonic drive register according to claim 2, the second harmonic drive comprising:
    a static spline; and
    a dynamic spline.

4. The harmonic drive register according to claim 3, wherein the dynamic spline of the first harmonic drive is attached to the dynamic spline of the second harmonic drive.

5. The harmonic drive register according to claim 1, wherein a ratio of the first harmonic drive is negative one.

6. The harmonic drive register according to claim 5, wherein a ratio of the second harmonic drive is positive one.

7. The harmonic drive register according to claim 1, the tandem coupling comprising:
    a right side member; and
    a left side member attached to the right side member.

8. The harmonic drive register according to claim 1, wherein the phase of the rotary shaft may be changed while the rotary shaft is rotating.

9. The harmonic drive register according to claim 1, the second harmonic drive comprising:
    a hollow hub;
    wherein the motor shaft passes through the hollow hub.

10. A harmonic drive register for selectively changing the phase of a rotary shaft, the harmonic drive register comprising:
    a first harmonic drive having;
        a first harmonic drive static spline; and
        a first harmonic drive dynamic spline engaged with the first harmonic drive static spline;
    a second harmonic drive having;
        a second harmonic drive static spline; and
        a second harmonic drive dynamic spline engaged with the second harmonic drive static spline;
    a tandem coupling that rotationally attaches the first harmonic drive dynamic spline to the second harmonic drive dynamic spline; and
    a motor having a motor shaft, the motor shaft being coupled to the first harmonic drive;
    wherein the ratio of the first harmonic drive to the second harmonic drive is one-to-one; and
    wherein selective rotation of the motor shaft selectively changes the phase of the rotary shaft.

11. The harmonic drive register according to claim 10, wherein a ratio of the first harmonic drive is negative one.

12. The harmonic drive register according to claim 11, wherein a ratio of the second harmonic drive is positive one.

13. The harmonic drive register according to claim 10, the tandem coupling comprising:
    a right side member; and
    a left side member attached to the right side member.

14. The harmonic drive register according to claim 10, wherein the phase of the rotary shaft may be changed while the rotary shaft is rotating.

15. The harmonic drive register according to claim 10, the second harmonic drive comprising:
    a hollow hub;
    wherein the motor shaft passes through the hollow hub.

16. An industrial corrugated box machine, comprising:
    a print and die cut section, comprising:
        a printing drum; and
        a harmonic drive register for adjusting the phase of the printing drum, the harmonic drive register comprising:
            a first harmonic drive;
            a second harmonic drive having a hollow hub;
            a tandem coupling that rotationally attaches the first harmonic drive to the second harmonic drive;
            a motor having a motor shaft, the motor shaft being coupled to the first harmonic drive; and
            a housing coupled to the second harmonic drive and the printing drum;

wherein the ratio of the first harmonic drive to the second harmonic drive is one-to-one;

wherein the motor drives the motor shaft, the motor shaft drives the first harmonic drive, the first harmonic drive drives the second harmonic drive, the second harmonic drive drives the housing, and the housing drives the printing drum; and wherein selective rotation of the motor shaft selectively changes the phase of the printing drum.

* * * * *